Dec. 11, 1928.
J. LEDWINKA
1,694,475
JIG FOR USE IN MAKING AUTOMOBILE BODIES
Filed April 15, 1924   2 Sheets-Sheet 1
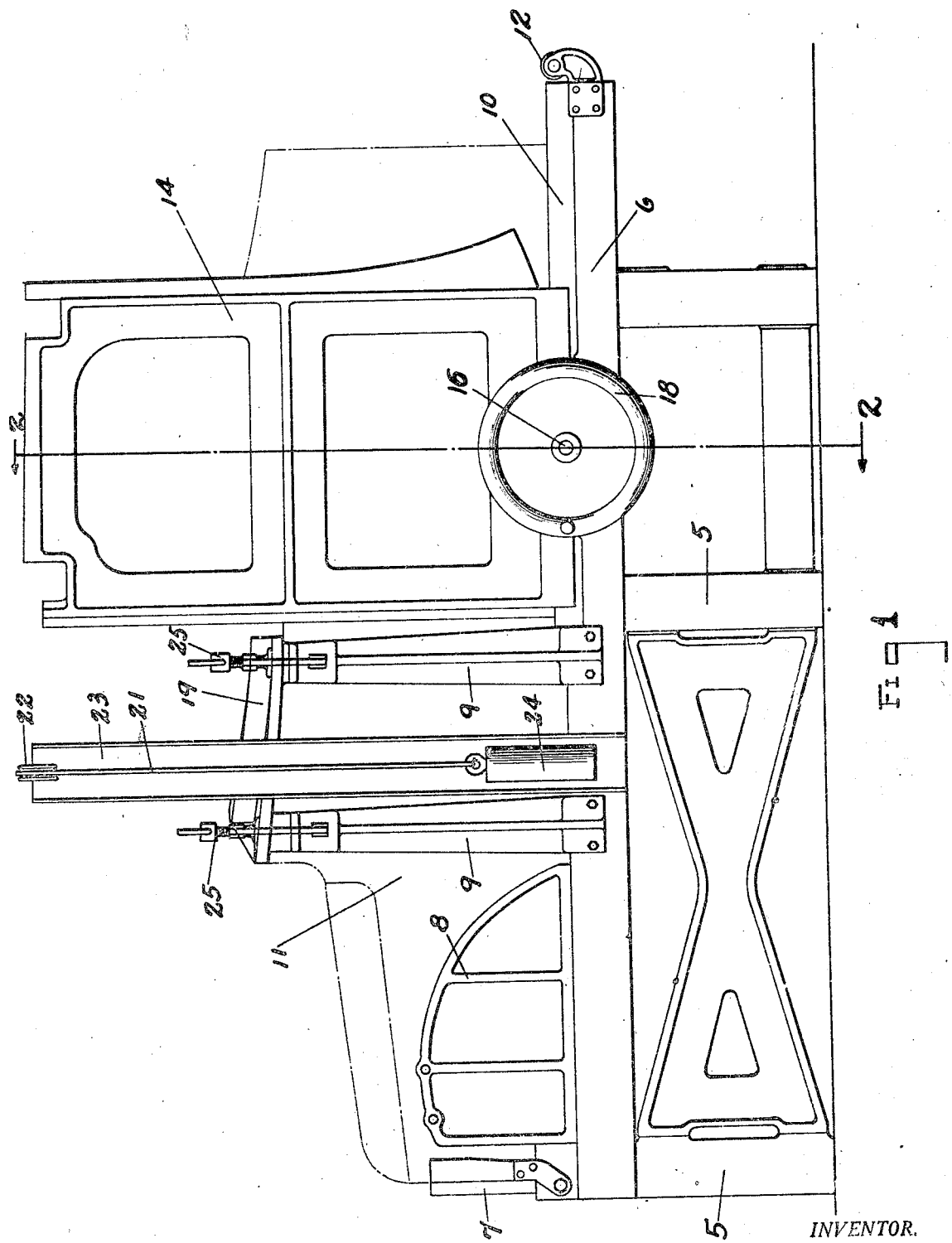
INVENTOR.
JOSEPH LEDWINKA
BY
ATTORNEY Dec. 11, 1928.  J. LEDWINKA  1,694,475

JIG FOR USE IN MAKING AUTOMOBILE BODIES

Filed April 15, 1924  2 Sheets-Sheet 2

INVENTOR.
JOSEPH LEDWINKA.
BY John P. Tarbox
ATTORNEY.

Patented Dec. 11, 1928.

1,694,475

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

JIG FOR USE IN MAKING AUTOMOBILE BODIES.

Application filed April 15, 1924. Serial No. 706,675.

This invention relates to jigs for use in making automobile bodies.

The object of the invention is to provide a jig which is simple in structure, easy to adjust, and efficient in operation, for receiving, properly positioning and holding an automobile body, or a unit assembly therefor or other part of such body while certain manufacturing operations thereon are being performed.

A further object is to provide a jig structure of the nature and for the purpose referred to wherein a shiftable counter balanced gage member is employed to secure uniformity of location of certain operations to be performed on the body, unit or part held in the jig.

A further object is to provide a jig structure of the nature referred to with adjustable means to removably engage the body, body unit, or the like and properly position and hold the same in place while being operated on.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

In the drawings—

Fig. 1 is a view in side elevation of a jig structure embodying the principles of my invention, a portion of an automobile body being indicated as disposed in place in the jig.

Fig. 2 is a view in vertical transverse section on the line 2—2, Fig. 1, looking in the direction of the arrows and showing the ledge portion 15 of the gates 14 engaging the threshold strips T of the body structure.

The same part is designated by the same reference numeral wherever it occurs throughout the several views.

In the manufacture of automobile bodies it is necessary to perform certain operations on the body, or on unit assemblies therefor, or parts entering into the structure thereof, which are required to be uniformly located in successive bodies, units or parts. For example, in the construction of closed bodies, it is customary to construct the lower and the upper parts of the body in separate units or assemblies, and then to apply and secure together the two assemblies or units. In such cases it is desirable to locate the points of attachment of the two units or assemblies in uniform relation so that the application and attachment of the same to each other may be accomplished quickly, thereby securing economy in the manufacture of the complete body structure. Thus, in the case of closed body structure it is the practice to punch or otherwise provide holes or other openings at various points in the top or belt rail of the lower part of the body structure to receive means for securing the upper part of the body thereto, and to enable the assembly to be accomplished quickly and readily without loss of time. Such holes or openings must be reproduced in successive units or assemblies in exact and uniform position and relation.

It is among the special purposes of my present invention to provide a jig structure which is adapted to detachably receive, position, and efficiently retain in uniform relation, a body, or a unit assembly therefor, or parts thereof, while the hole forming or punching or other operations are being performed, and to accurately gage and uniformly locate the points at which such operations are to be performed.

While I have shown my invention as applied in a jig structure adapted for use in the manufacture of closed bodies, it is to be understood, of course, that in its broadest scope, as defined in the claims, my invention is not to be restricted or limited to use in connection with closed automobile bodies, but is capable of and well adapted for use in the manufacture of touring car and other type of bodies, as well as of body assemblies or units or parts, wherein the uniform, expeditious performance of mechanical operations is required or desired.

Figure 3:
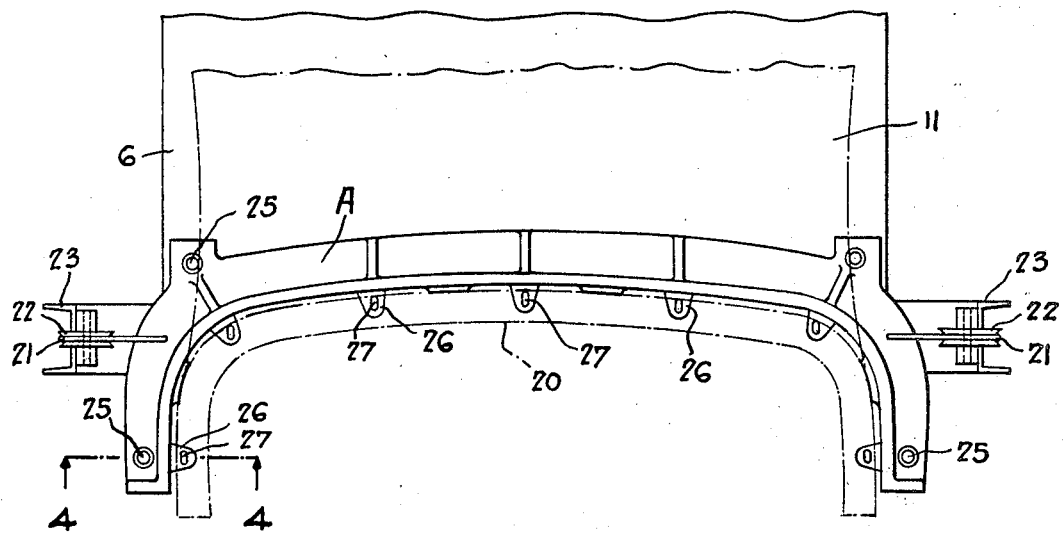
Fig. 3 is a view in top plan of the forward portion of the jig showing the application of the counterweighted gage member to a body or body unit.

Referring to the accompanying drawings, 8 designates a suitable framework upon which is mounted a bed plate 6 having an end abutment 7, a pair of side stops 8, vertically disposed side standards 9, and side ledge members 10. Of these elements all but the end abutment 7 are preferably relatively fixed in position with respect to the bed plate 6. The end abutment 7, however, may, if desired, be mounted for pivotal movement about the pivot 7ª, any suitable means being provided for maintaining it in the operative position shown in Fig. 1. An automobile body, or unit assembly therefor, or parts thereof, in this instance the lower section of a coupé body, as indicated at 11, Figs. 1 and 3, is designed to be received upon the bed plate 6 between the side ledge members 10, standards 9 and side stops 8, and to abut at its rear end against the abutment 7 whereby such body, unit assembly or part is efficiently and quickly positioned in place within the jig. In order to facilitate the insertion of the body, unit assembly or body part into and its removal from the jig, the front end of the jig structure is freely open and an antifriction roller 12 is disposed at the front end of the jig to extend transversely across the same at an elevation slightly above the upper surface of the bed plate 10. For purposes solely of description that portion of the framework against which the rear end of the body or unit abuts has been arbitrarily designated as the rear end of the framework and conversely the front end of the framework is that end which corresponds to the front end of the body or body unit.

Figure 2:
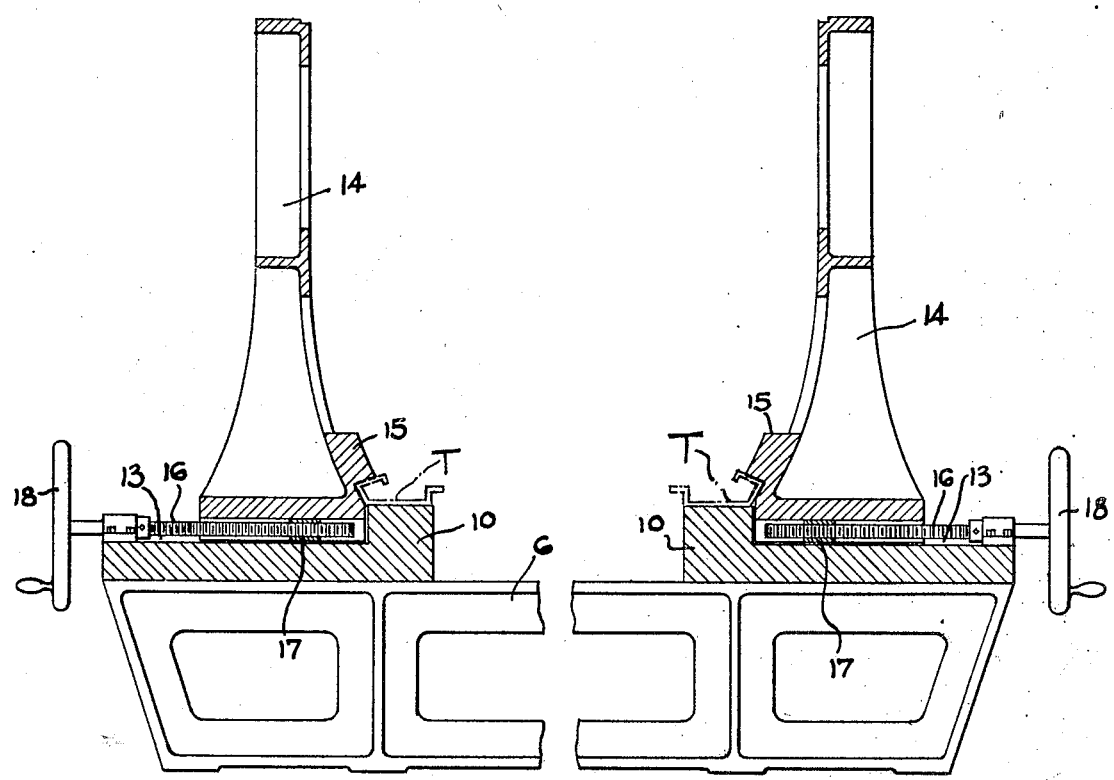
Figure 4:
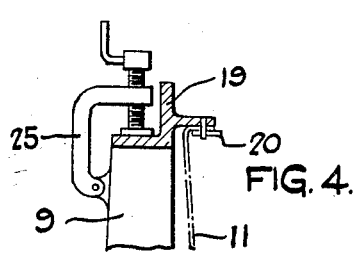
Fig. 4 is a detail view in section on the line 4—4, Fig. 3, looking in the direction of the arrows.

Adjustably mounted in transversely extending guideways, 13, in the side ledge members, 10, at opposite sides of the jig, are vertically arranged gate members, 14, designed to be adjusted into and out of the doorway openings of the body or body unit assembly and to fit snugly within such doorway opening with its vertical edges engaging between the door posts of the doorway. Each gate member, 14, is formed or provided on its inner face with a ledge portion, 15, see Fig. 2, to engage over the door sill or threshold strip of the body, to thereby not only properly position the body or body unit assembly, but also to retain the same rigidly in position. Provided at the top of each of these gate members 14 is a rabbeted edge or shoulder 15ª adapted to complementally receive and support in position the top rail or other element of the roof structure of the body. The inner surfaces of the gate members are vertically curved, as is best shown in Fig. 2, to correspond to the vertical configuration of the automobile body. It will thus be apparent that I have provided a pair of members adapted for snug engagement with the perimetral walls of the door openings in the body, which members serve not only to prevent longitudinal displacement of the body with respect to the framework, but which also serve to reinforce and interbrace the sides of the body while the various operations are being performed thereon. The gates, 14, may be adjusted in any suitable or convenient manner into and out of engaging relation with respect to a body or body unit doorway. A simple arrangement for this purpose is shown wherein a hand operated adjusting screw 16, engages a nut, 17, in the base of the gate, whereby, by operating the handwheel, 18, the gate may be advanced into engaging relation with respect to the doorway or opening of the body, or may be withdrawn therefrom.

In order to properly and uniformly locate the places and positions where mechanical or other operations, such as the punching or forming holes, or the like, are to be performed, I employ a movable gage member, 19, shown in this instance as a gage to locate punch holes in the top rail, 20, of the body. This gage member is normally maintained in elevated or raised position, where it will not interfere with the positioning or removal of the body or unit in the jig, and it may be lowered into position onto the body, or body unit or part, after the latter has been properly positioned in the jig, and held or clamped in position thereon. A simple and efficient arrangement is shown for permitting the raising and lowering of the gage member, 19, wherein the gage member is carried by flexible cords or similar supporting members, 21, which operate over pulleys, 22, at the upper ends of uprights, 23, fastened to the bed plate, 6, the other ends of said flexible members or cords being connected to counterweights, 24, the weights of which are so proportioned as to normally maintain the gage member, 19, in elevated or raised position from which it may be very readily and easily lowered by hand into place upon the top or belt rail, 20, or other part of the body or body unit. After being lowered into place for use, the gage member, 19, may be retained in position by hand or otherwise. The means which I have shown for this purpose, though it is to be understood that any other means may be employed, are clamps 25 suitably pivoted at 25ª to bearings on the standards 9. In this particular instance the clamp 25 comprises a bracket 30 having a portion 31 adapted to be swung into position over the gage member 19, this portion 31 being threaded to receive a clamping bolt 32 which is adapted to be screwed into clamping engagement with the gage member.

The gage member, in this instance, is shown as extending transversely across the body and as shaped in the direction of its length to the contour of the upper or belt rail, 20, of the body, and is provided with inwardly projecting ears, 26, having openings, 27, through which may operate punches or other tools. These ears extend over the upper or belt rail of the body when the gage member is lowered into position for use, and serve, in this instance, to locate the points where punch holes are to be formed in the top or belt rail.

From the foregoing description it will be seen that I provide an exceedingly simple and efficient jig structure into or from which a body or a body unit assembly or part may be quickly and easily inserted or removed, and which, when inserted, is positioned and held in place, while the required manufacturing operations thereon are being performed. It will also be seen that while so positioned and retained in place, the points where punch holes are to be made, or other operations are to be performed, are uniformly located, thereby enabling the operations to be expedited with assurance of uniformity in the successive bodies or assemblies. This enables the work of producing the finished bodies to be accomplished most expeditiously, thereby reducing the cost of manufacture, and secures expedition in assembly of the bodies.

Many variations and changes in detail will readily occur to persons skilled in the art without departure from the spirit and scope of my invention.

Having now set forth the objects and nature of my invention, and a structure embodying the principles thereof, what I claim as new and useful and of my own invention, and desire to secure by Letters Patent is—

1. In a jig structure, a framework to receive a body, body unit assembly or the like, in combination with a positioning and retaining member arranged to engage between the door posts of the body or body unit, and means to adjust said member into and out of engaging relation with respect to the door posts, and means carried by said member to engage over the door sill of the body or body unit.

2. In a jig structure, a framework including a bed plate, side members and an end stop at one end to receive and position an automobile body, or assembly unit, and means carried by said bed plate and transversely adjustable thereon, to engage and hold the body or unit in place in contact with said end stop.

3. In a jig structure, a framework including a bed plate, side members and an end stop at one end to receive and position an automobile body, or assembly unit, and means carried by said bed plate and transversely adjustable thereon, to engage and hold the body or unit in place, the front end of said structure being open, and a roller disposed at such open end and slightly above the upper surface of the bed plate.

4. In a jig structure, a supporting framework constructed to receive an automobile body, unit assembly or the like, having a door opening at its side, a positioning and holding member similar in shape and size to said door opening, and adapted to fit within and engage the edges of the same, said member being slidably carried at its lower edge by said framework, and means to move said member laterally into said door opening with its periphery in snug engagement with the perimetral walls thereof.

5. In a jig structure, a supporting framework constructed to receive an automobile body, unit assembly or the like, having a door opening at its side, a positioning and holding member having marginal grooves shaped to receive the perimetral edges of said opening, said member being carried by said frame, and means for moving said member laterally into engagement with the walls of said opening.

6. A device of the character described comprising a framework in the form of a jig to receive the base of an automobile body, unit assembly or the like, a lateral positioning member having an overhanging portion to engage over the door sill or threshold strip of the body or unit, and adjustable laterally towards and from engaging position.

7. An assembling machine for automobile bodies comprising a form to receive and hold all of the members of a complete automobile body, unit assembly or the like, said form having associated therewith transversely movable means adapted for snug engagement inside of the perimetral walls of a door opening in said body or unit, and having means to engage and abut against the outer face of said walls to limit the movement of said form relative thereto.

8. A machine for assembling automobile bodies, unit assemblies, or the like, including side portions provided with door openings having thresholds, said machine comprising a member adapted for movement into and out of one of said openings, said member being provided with means for positioning engagement with the threshold of said opening when said member is within the same.

9. A machine for assembling automobile bodies, unit assemblies or the like, having spaced door posts in the sides thereof, said machine comprising a base including a transversely extending end frame and relatively horizontally adjustable vertically extending gates mounted for movement into the space between said door posts and of a width to snugly fit said space, whereby relative displacement of said body or unit with respect to said end frame is prevented.

10. An assembling machine for an automobile body, unit assembly or the like, comprising a form to receive said body or assembly, said form including a transversely movable side member for engaging said body or assembly to prevent longitudinal displacement thereof with respect to said form, in combination with a gage member, and means for mounting said gage member for vertical movement, said gage member adapted to overlie portions of said body or unit for locating the points where mechanical operations are to be performed thereon.

11. In a jig structure, means to position and retain the work in place, in combination with a gage member, means to suspend said gage member for vertical movement above the work, said means comprising a pulley, a flexible element passing over said pulley and secured at one end to said gage, and a counterweight attached to the other end of said flexible element, said gage member having means to locate points at which operations are to be performed on the work.

12. In a jig structure, means to position and retain the work in place, in combination with a gage member, means to suspend said gage member above the work, said means comprising a pulley, a flexible element passing over said pulley and secured at one end to said gage, and a counterweight attached to the other end of said flexible element, said gage member having means to locate points at which operations are to be performed on the work, and means to retain said gage member in lowered position on the work.

In witness whereof, I affix my signature.

JOSEPH LEDWINKA.